United States Patent
Johnson et al.

(10) Patent No.: US 7,860,497 B2
(45) Date of Patent: Dec. 28, 2010

(54) DYNAMIC CONFIGURATION MANAGEMENT

(75) Inventors: Steven A. Johnson, Santa Ana, CA (US); Tri M. Phan, Renton, WA (US); C. L. Fagan, Bellevue, WA (US); Michael A. D'Annunzio, Seattle, WA (US); Ben C. Forbes, Seattle, WA (US); Christopher R. Payne, Sammamish, WA (US); Rolf P. Dietiker, Laguna Niguel, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/973,727

(22) Filed: Oct. 26, 2004

(65) Prior Publication Data

US 2005/0221818 A1 Oct. 6, 2005

Related U.S. Application Data

(60) Provisional application No. 60/558,612, filed on Mar. 31, 2004.

(51) Int. Cl.
*H04W 4/00* (2009.01)
*G01M 17/00* (2006.01)
*G08B 21/00* (2006.01)

(52) U.S. Cl. ............... 455/431; 701/29; 701/33; 701/35; 340/945

(58) Field of Classification Search .......... 455/431, 455/67.11, 95–99, 423, 345, 427–430, 9, 455/12.1, 13.1; 340/945–983, 438–439; 701/3–18, 29, 30–36
See application file for complete search history.

(56) References Cited

U.S. PATENT DOCUMENTS

| 3,972,045 | A | 7/1976 | Perret |
| 4,392,139 | A | 7/1983 | Aoyama et al. |
| 4,743,906 | A | 5/1988 | Fullerton |
| 4,866,515 | A | 9/1989 | Tagawa et al. |
| 4,901,307 | A | 2/1990 | Gilhousen et al. |
| 4,958,381 | A | 9/1990 | Toyoshima |

(Continued)

FOREIGN PATENT DOCUMENTS

EP 0577054 1/1994

(Continued)

OTHER PUBLICATIONS

Boeing Phased Array Antenna Installed on Business Jet, Boeing Press Release, Nov. 7, 1996, (1 pg).
Vertatschitsch et al., Boeing Satellite Television Airplane Receiving System (STARS) Performance, International Mobile Satellite Conference, Ottawa - 1995, (5 pgs).

*Primary Examiner*—George Eng
*Assistant Examiner*—Nam Huynh
(74) *Attorney, Agent, or Firm*—Toler Law Group

(57) ABSTRACT

Configuration of hardware and software onboard a mobile platform may be dynamically managed without significantly impacting a data stream from the mobile platform. Configuration data for equipment and resident software aboard a mobile platform is electronically reported in the form of a part number and a serial number. The configuration data is transferred to a terrestrial database via a mobile communications network. The configuration data is displayed to stakeholders, such as the network-provider enterprise and its customers. Invalid configurations may cause alerts.

24 Claims, 14 Drawing Sheets

U.S. PATENT DOCUMENTS

| | | | |
|---|---|---|---|
| 5,127,021 A | 6/1992 | Schreiber | |
| 5,146,234 A | 9/1992 | Lalezari | |
| 5,230,076 A | 7/1993 | Wilkinson | |
| 5,249,303 A | 9/1993 | Goeken | |
| 5,285,470 A | 2/1994 | Schreiber | |
| 5,289,272 A | 2/1994 | Rabowsky et al. | |
| 5,311,302 A | 5/1994 | Berry et al. | |
| 5,313,457 A | 5/1994 | Hostetter et al. | |
| 5,463,656 A | 10/1995 | Polivka et al. | |
| 5,473,601 A | 12/1995 | Rosen et al. | |
| 5,485,485 A | 1/1996 | Briskman et al. | |
| 5,495,258 A | 2/1996 | Muhlhauser et al. | |
| 5,524,272 A | 6/1996 | Podowski et al. | |
| 5,537,679 A * | 7/1996 | Crosbie et al. | 455/13.2 |
| 5,555,466 A | 9/1996 | Scribner et al. | |
| 5,568,484 A | 10/1996 | Margis | |
| 5,583,735 A | 12/1996 | Pease et al. | |
| 5,592,539 A | 1/1997 | Amarant et al. | |
| 5,760,819 A | 6/1998 | Sklar et al. | |
| 5,761,602 A | 6/1998 | Wagner et al. | |
| 5,761,606 A | 6/1998 | Wolzien | |
| 5,790,175 A | 8/1998 | Sklar et al. | |
| 5,801,751 A | 9/1998 | Sklar et al. | |
| 5,861,856 A | 1/1999 | Beele et al. | |
| 5,973,647 A | 10/1999 | Barrett et al. | |
| 5,974,349 A | 10/1999 | Levine | |
| 5,990,928 A | 11/1999 | Sklar et al. | |
| 6,018,659 A | 1/2000 | Ayyagari et al. | |
| 6,023,242 A | 2/2000 | Dixon | |
| 6,028,562 A | 2/2000 | Guler | |
| 6,034,634 A | 3/2000 | Karlsson et al. | |
| 6,047,165 A | 4/2000 | Wright et al. | |
| 6,061,387 A | 5/2000 | Yi | |
| 6,061,562 A | 5/2000 | Martin et al. | |
| 6,078,577 A | 6/2000 | Bishop et al. | |
| 6,104,914 A | 8/2000 | Wright et al. | |
| 6,108,523 A | 8/2000 | Wright et al. | |
| 6,122,261 A | 9/2000 | Fernandes et al. | |
| 6,167,286 A | 12/2000 | Ward et al. | |
| 6,175,717 B1 | 1/2001 | Rebec et al. | |
| 6,208,307 B1 | 3/2001 | Frisco et al. | |
| 6,229,844 B1 | 5/2001 | Kong | |
| 6,249,913 B1 | 6/2001 | Galipeau et al. | |
| 6,339,611 B1 | 1/2002 | Antonio et al. | |
| 6,347,001 B1 | 2/2002 | Arnold et al. | |
| 6,356,235 B2 | 3/2002 | Laidig et al. | |
| 6,411,824 B1 | 6/2002 | Eidson | |
| 6,438,468 B1 * | 8/2002 | Muxlow et al. | 701/3 |
| 6,477,152 B1 | 11/2002 | Hiett | |
| 6,507,956 B1 | 1/2003 | Kronenbeger | |
| 6,529,706 B1 | 3/2003 | Mitchell | |
| 6,553,239 B1 | 4/2003 | Langston | |
| 6,567,729 B2 * | 5/2003 | Betters et al. | 701/29 |
| 6,574,338 B1 | 6/2003 | Sachdev | |
| 6,628,919 B1 | 9/2003 | Curello et al. | |
| 6,741,841 B1 | 5/2004 | Mitchell | |
| 6,751,442 B1 | 6/2004 | Barrett | |
| 6,757,712 B1 | 6/2004 | Bastian et al. | |
| 6,768,715 B2 * | 7/2004 | Hsu et al. | 370/229 |
| 6,807,538 B1 | 10/2004 | Weinberger et al. | |
| 6,812,903 B1 | 11/2004 | Sievenpiper et al. | |
| 6,863,246 B2 * | 3/2005 | Kane et al. | 246/121 |
| 7,248,841 B2 | 7/2007 | Agee et al. | |
| 2002/0087992 A1 | 7/2002 | Bengeult et al. | |
| 2002/0160773 A1 | 10/2002 | Gresham | |
| 2003/0187554 A1 * | 10/2003 | Henry et al. | 701/29 |
| 2003/0208579 A1 * | 11/2003 | Brady et al. | 709/223 |
| 2003/0225492 A1 * | 12/2003 | Cope et al. | 701/35 |
| 2004/0036648 A1 | 2/2004 | Carson | |
| 2004/0106404 A1 * | 6/2004 | Gould et al. | 455/431 |
| 2004/0176887 A1 * | 9/2004 | Kent et al. | 701/30 |
| 2005/0065682 A1 * | 3/2005 | Kapadia et al. | 701/35 |
| 2005/0278768 A1 | 12/2005 | Boyer | |

FOREIGN PATENT DOCUMENTS

| | | |
|---|---|---|
| EP | 0577054 A1 | 1/1994 |
| EP | 1096699 | 5/2001 |
| EP | 1209928 | 5/2002 |
| WO | WO 9424773 A1 | 10/1994 |
| WO | WO 0014987 A1 | 3/2000 |
| WO | WO 0197433 | 12/2001 |
| WO | WO 0215582 | 2/2002 |
| WO | WO 0227975 | 4/2002 |

* cited by examiner

Sensed By Tail Number SIF0004

| | Product Name | Product ID | Serial Number | Date Sensed |
|---|---|---|---|---|
| 1 | DTR | VA017250-2500 | 15-000009 | 02/17/2004 |
| 2 | AIM | 822-1996-101 | 14M8W | 02/17/2004 |
| 3 | EGM | 822-1999-001 | 14M8L | 02/17/2004 |
| 4 | CSM | 822-2000-001 | 14M1H | 02/17/2004 |
| 5 | AAS_ACU | 726-20176-601 | 10030009 | 02/17/2004 |
| 6 | AAS_Converter | 726-20176-301 | 10030009 | 02/17/2004 |
| 7 | AAS_ADU | 726-20176-401 | 10030009 | 02/17/2004 |
| 8 | AAS_Antenna | 726-20176-101 | 10030009 | 02/17/2004 |
| 9 | AAS_SSPA_Power_Supply | 726-20176-201 | 10030009 | 02/17/2004 |
| 10 | AAS_PSU | 726-20176-501 | 10030009 | 02/17/2004 |
| 11 | AAS_ACU | 726-20176-701R | 03320007 | 02/17/2004 |
| 12 | AAS_Aircraft_ID | 726-20176-801R | 03320007 | 02/17/2004 |
| 13 | AAS_ACU_SW | S0205EB1000A2.09 | | 02/17/2004 |
| 14 | IOTABLE777.LUH | IOTABLE777 | | 02/17/2004 |
| 15 | LSP PN | VIS34-000A-0018 | | 02/17/2004 |
| 16 | COL331973M002.LUH | COL33-1973-M002 | | 02/17/2004 |
| 17 | EGM Software | CBB47-21116-001 | | 02/17/2004 |
| 18 | COLCC1973FA02.LUH | COLCC-1973-FA02 | | 02/17/2004 |
| 19 | COLCC1973FA01.LUH | COLCC-1973-FA01 | | 02/17/2004 |

Installed By Tail Number SIF0004

| | Product Name | Product ID | Serial Number | Date Installed | Status |
|---|---|---|---|---|---|
| 1 | DTR | VA017250-2500 | 15-000009 | 01/01/2004 | Installed |
| 2 | AIM | 822-1996-101 | 14M8W | 12/06/2003 | Installed |
| 3 | EGM | 822-1999-001 | 14M8L | 12/06/2003 | Installed |
| 4 | CSM | 822-2000-001 | 14M1J | 02/18/2004 | Installed |
| 5 | AAS_ACU | 726-20176-601 | 10030009 | 11/27/2003 | Installed |
| 6 | AAS_Converter | 726-20176-301 | 10030009 | 01/04/2004 | Installed |
| 7 | AAS_ADU | 726-20176-401 | 10030009 | 11/27/2003 | Installed |
| 8 | AAS_Antenna | 726-20176-101 | 10030009 | 11/27/2003 | Installed |
| 9 | AAS_SSPA_Power_Supply | 726-20176-201 | 10030009 | 11/27/2003 | Installed |
| 10 | AAS_PSU | 726-20176-501 | 03320007 | 01/04/2004 | Installed |
| 11 | AAS_ACU | 726-20176-701R | 03320007 | 01/04/2004 | Installed |
| 12 | AAS_Aircraft_ID | 726-20176-801R | | 01/04/2004 | Installed |
| 13 | IOTABLE777.LUH | IOTABLE777 | | 01/04/2004 | Installed |
| 14 | COLCC1973FA02.LUH | COLCC-1973-FA02 | | 12/06/2003 | Installed |
| 15 | AAS_ACU_SW | S0205EB1000A2.09 | | 12/21/2003 | Installed |
| 16 | EGM Software | CBB47-21116-001 | | 01/04/2004 | Installed |
| 17 | LSP PN | VIS34-000A-001B | | 01/04/2004 | Installed |
| 18 | COLCC1973FA01.LUH | COLCC-1973-FA01 | | 12/06/2003 | Installed |
| 19 | COL331973M002.LUH | COL33-1973-M002 | | | |
| 20 | GSM | 822-2000-001 | 14M1H | 01/04/2004 | Uninstalled |

DYNAMIC CONFIGURATION MANAGEMENT

CROSS-REFERENCE TO RELATED APPLICATIONS

This Application is a Non-Prov of Prov (35 USC 119(e)) application 60/558,612 filed on Mar. 31, 2004, the contents of which are hereby incorporated by reference.

FIELD OF THE INVENTION

This invention relates generally to configuration management and, more specifically, to configuration management of mobile communication networks.

BACKGROUND OF THE INVENTION

Information is often exchanged and entertainment content is often broadcast as packetized data over communication networks. Typically, an end user accesses information or entertainment content via a user terminal such as a desktop computer, a laptop computer, a personal digital assistant (PDA), and Internet-enabled mobile phone, or the like. The user terminals may be connected to the network via wireless radiofrequency (RF) connectivity or, with the exception of a mobile phone, via a cable connection. Further, the network typically includes routers and servers for routing the data packets from content providers or other network destinations to the end user through networks, such as the internet.

Organizations and enterprises are becoming more and more dependent upon such networks for day-to-day operations. Further, a significant number of organizations, such as Connexion by Boeing™, are in the business of providing such networks for end users. Because of the importance of maintaining network operations to organizations and to end-users/customers, network management tools have been developed to monitor network operations and status.

In accordance with sound engineering practices, providers of such communications networks manage the configuration of their networks. This configuration management entails planning, implementing, and tracking changes to hardware such as line replaceable units (LRUs) and software revisions.

Conventional network configuration management tools assume that a network is physically stationary—such as being installed in a land-based facility like a building. To that end, conventional configuration management techniques may entail physical audits or hands-on verification of hardware and/or software configuration. Alternately, network configuration management tools may continuously monitor installed hardware and software for configuration reporting. Because terrestrial-based networks may have data rates (also referred to as bandwidth) on the order of up to around 100 Mbits/sec (bps), continuously monitoring for configuration management information does not noticeably affect bandwidth available for carrying data and content for which paying customers are accessing the network.

However, a node of a communication network may be a mobile platform such as an airplane, a maritime vessel, a land vehicle, or the like. In such a mobile network, often the node will be in revenue service. During these times the node may be inaccessible for physical inspections for configuration management purposes.

Further, bandwidth in mobile communications networks is often at least an order of magnitude lower than bandwidth for terrestrial communications networks. For example, data rate from a mobile platform to a ground station in a mobile communications network may be on the order of around 16-128 Kbps. As a result, continuously including configuration management information in the data stream from a mobile platform may significantly detract from bandwidth available for providing data from paying customers.

It would be desirable for a tool to manage configuration of hardware and software onboard a mobile platform. However, there is an unmet need in the art for a tool to dynamically manage configuration of hardware and software onboard a mobile platform without significantly impacting the data stream from the mobile platform.

SUMMARY OF THE INVENTION

Embodiments of the present invention provide a method and system for managing configuration of hardware and software onboard a mobile platform. Advantageously, according to embodiments of the present invention configuration of hardware and software onboard a mobile platform may be dynamically managed without significantly impacting the data stream from the mobile platform.

According to an exemplary embodiment of the present invention, configuration data for equipment and resident software aboard a mobile platform is electronically reported in the form of a part number and a version number. The configuration data is transferred to a terrestrial database via a mobile communications network. The configuration data is displayed to stakeholders, such as the network-provider enterprise and its customers. Invalid configurations may cause alerts.

According to another embodiment of the present invention, configuration data is sensed onboard a mobile platform and transmitted to a ground station when either a server onboard the mobile platform is booted or the mobile platform has been out of communication for a predetermined time period such as around an hour. The sensed data is compared with a configuration history at the ground station. A determination is made whether or not a configuration change is indicated. If so, then additional data is requested by the ground station, and is sensed onboard the mobile platform and transmitted to the ground station.

According to an aspect of the present invention, the configuration data is reported for hardware and software onboard a mobile platform and within terrestrial components of a mobile communications network. The configuration data may include part number and serial number. Hardware may be tracked to a level of serialized line replaceable units (LRUs) or line replaceable modules (LRMs). Software may be tracked to version.

According to another aspect of the present invention, the configuration data for the mobile platform and the terrestrial components is accessible by the operator of the mobile communications network. Configuration data that pertains to mobile platforms in a customer's fleet may be accessed by the customer. The configuration data may be accessed via Web access.

BRIEF DESCRIPTION OF THE DRAWINGS

FIGS. 6-14 are screen shots of an exemplary implementation of an embodiment of the present invention.

DETAILED DESCRIPTION OF THE INVENTION

Embodiments of the present invention provide a method and system for managing configuration of hardware and software onboard a mobile platform. Advantageously, according to embodiments of the present invention configuration of hardware and software onboard a mobile platform may be dynamically managed without significantly impacting the data stream from the mobile platform.

By way of overview and according to an embodiment of the present invention, equipment aboard a mobile platform reports electronically its configuration data and configuration data for resident software in the form of a part number and a serial number. The configuration data is transferred to a stationary, terrestrial database via a mobile communications network. The configuration data is searchable and viewable via a Web interface. The configuration data is displayed to the network-provider enterprise and its customers. Invalid configurations would cause alerts.

An exemplary mobile communications network that communicates with the mobile platform will first be explained by way of non-limiting example. Next, exemplary systems and methods for managing configuration of the mobile platform will be explained. Finally, screen shots of an exemplary implementation of embodiments of the present invention will be discussed.

Exemplary Mobile Network

Figure 1:
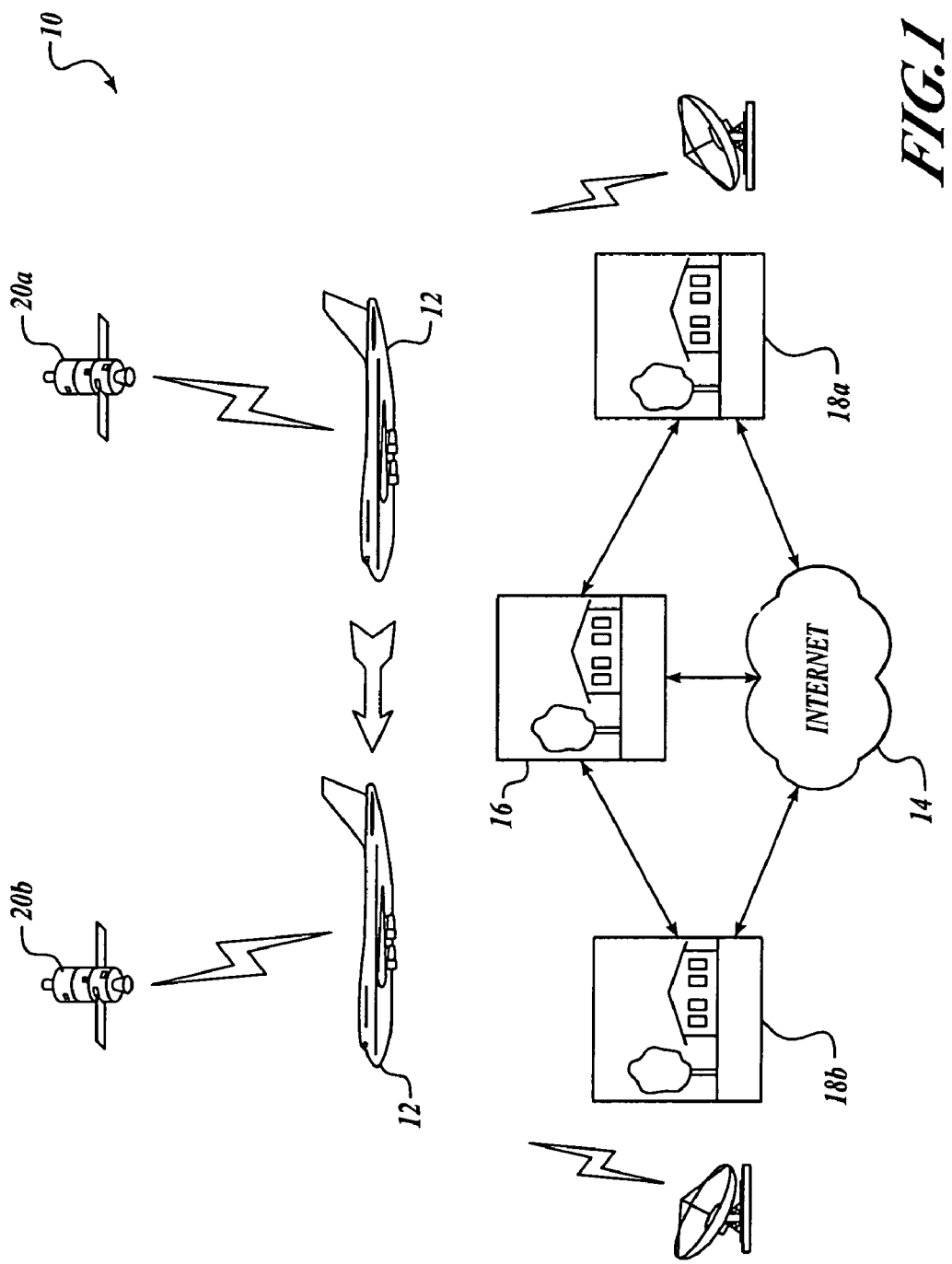
FIG. 1 is an exemplary mobile communications network.

Referring now to FIG. 1 and given by way of non-limiting example, an exemplary mobile communications network 10 provides communications between a mobile platform 12 and destinations connected to a network 14, such as the Internet. The mobile platform 12 may be any mobile platform as desired, such as without limitation an airplane, a maritime vessel, a land vehicle, or the like. While the mobile platform 12 is illustrated herein by way of non-limiting example, it is to be understood that such a representation is not intended to limit the mobile platform 12 to an airplane.

A network control facility 16, such as a network operations center (NOC), is in digital packet communication with the network 14. Ground stations 18a and 18b are in digital packet communication with the network 14 and the network control facility 16. The ground stations 18a and 18b are in radiofrequency (RF) communication with satellites 20a and 20b, respectively, such as without limitation Ku or Ka band geostationary satellites, that each have their own area of RF coverage. The mobile platform 12 is in RF communication with the satellite 20a when the mobile platform 12 is within the area of RF coverage of the satellite 20a. The mobile platform 12 is in RF communication with the satellite 20b when the mobile platform 12 is within the area of RF coverage of the satellite 20b. RF transmissions from the ground stations 18a and 18b to the satellites 20a and 20b, respectively, and from the satellites 20a and 20b to the mobile platform 12 are referred to as a forward link. RF transmissions from the mobile platform 12 to the satellites 20a and 20b and from the satellites 20a and 20b to the ground stations 18a and 18b, respectively, are referred to as a return link. If desired, entertainment content can be provided to the mobile platform 12 via the forward link.

Given by way of non-limiting example, an exemplary mobile communications network 10 that is well-suited for implementing embodiments of the present invention is Connexion by Boeing. Details regarding Connexion by Boeing are set forth in U.S. patent application Ser. No. 09/989,742 published as U.S. patent application publication No. 2002/0087992, the contents of which are hereby incorporated by reference. It will be appreciated that RF connectivity may be established via cellular RF communications directly between the mobile platform 12 and the ground stations 18a and 18b instead of satellite RF communications, if desired.

Exemplary Systems and Methods for Managing Configuration

Details will now be set forth regarding exemplary systems and methods for managing configuration of the mobile platform 12.

Figure 2:
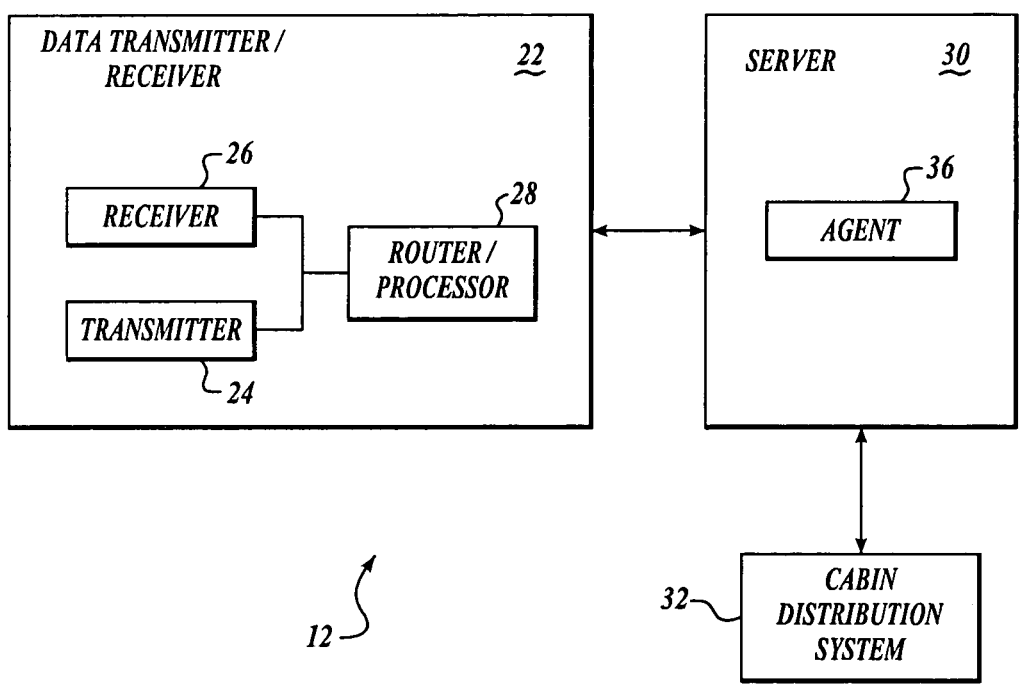
FIG. 2 is a diagram of an exemplary system according to an embodiment of the present invention.

Referring now to FIG. 2, details will now be set forth regarding the mobile platform 12. The mobile platform 12 includes a data transmitter/receiver (DTR) 22. The DTR 22 includes a transmitter 24 and a receiver 26. The transmitter 24 and the receiver 26 are any suitable transmitter and receiver known in the art for transmitting and receiving Ka band or Ku band RF communications, or RF communications in frequency bands assigned to cellular or G3 communications, as desired. The transmitter 24 and the receiver 26 may be stand-alone components or may be provided as a transceiver, as desired for a particular application. The transmitter 24 and the receiver are both in signal communication with suitable transmit and receive antennas (not shown) or a suitable antenna with transmit and receive apertures, as desired. The antenna(s) may be any suitable phased array antenna or mechanical antenna known in the art as desired for a particular application.

The transmitter 24 and the receiver 26 are in digital packet communication with a router/processor 28. The router/processor 28 is any suitable router known in the art.

A server 30 is in digital packet communication with the router/processor 28. The server 30 is any suitable server known in the art. The server 30 distributes digital data packets to and from a distribution system 32 within a cabin (not shown) of the mobile platform. User terminals (not shown) such as laptop computers, personal digital assistants, cellular phones, or the like, or cabin displays and loudspeakers, as desired, are in wired or wireless packet communication with the server 30 via the cabin distribution system 32.

The components of the mobile platform as set forth above are known in the art, and a detailed discussion of their construction and operation is not necessary for an understanding of the invention. Nonetheless, further details of an exemplary DTR 22, server 30, and cabin distribution system 32 are set forth in U.S. patent application Ser. No. 09/989,742 published as U.S. patent application publication No. 2002/0087992, the contents of which are hereby incorporated by reference.

According to an embodiment of the present invention, the server 30 includes a software agent 36 that is resident on the server 30. The agent 36 performs processes described below to read configuration data onboard the mobile platform 12 and, under appropriate conditions described below, places the configuration data in a pre-formatted status message and causes the server 30 to communicate the status message to the DTR 22 for transmission. The agent 36 also receives and responds to requests from the network control facility 16 to cause the configuration data to be transmitted.

Figure 3:
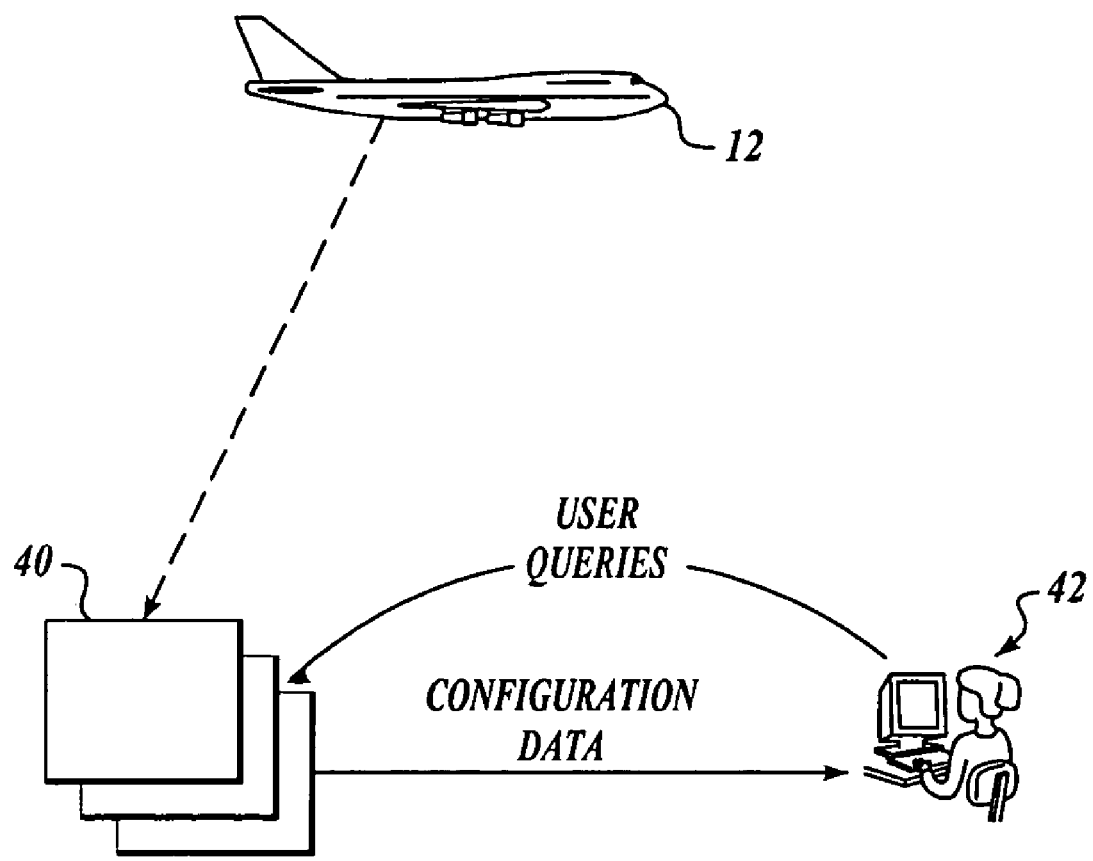
FIG. 3 is a diagram showing portions of the system of FIG. 2.

Referring additionally now to FIG. 3, equipment aboard the mobile platform 12 reports electronically its configuration data and configuration data for resident software in the form of a part number and a serial number. Hardware components suitably are tracked to a level of serialized line replaceable units (LRUs) and line replaceable modules (LRMs). For resident software, the configuration data may also include version number, revision number, release number, or the like.

In one embodiment, configuration data is reported for the equipment and resident software onboard the mobile platform 12 that provides the communication service as part of the network 10 (FIG. 1). That is, the configuration data is reported for the DTR 22, the server 30, equipment within the cabin distribution system 32, and software resident therein. However, in another embodiment configuration data is reported for any equipment and resident software whatsoever that is installed onboard the mobile platform 12.

The configuration data is transferred from the mobile platform 12 via communications links within the mobile communications network 10 (FIG. 1) to a stationary, terrestrial database 40. The database 40 suitably resides within a server (not shown) in the network control facility 16 (FIG. 1). Advantageously, the configuration data is searchable and viewable via a Web interface 42. As will be discussed below, the configuration data for the mobile platform 12 is displayed to the network-provider enterprise and its customers. Invalid configurations would cause alerts.

Figure 4:
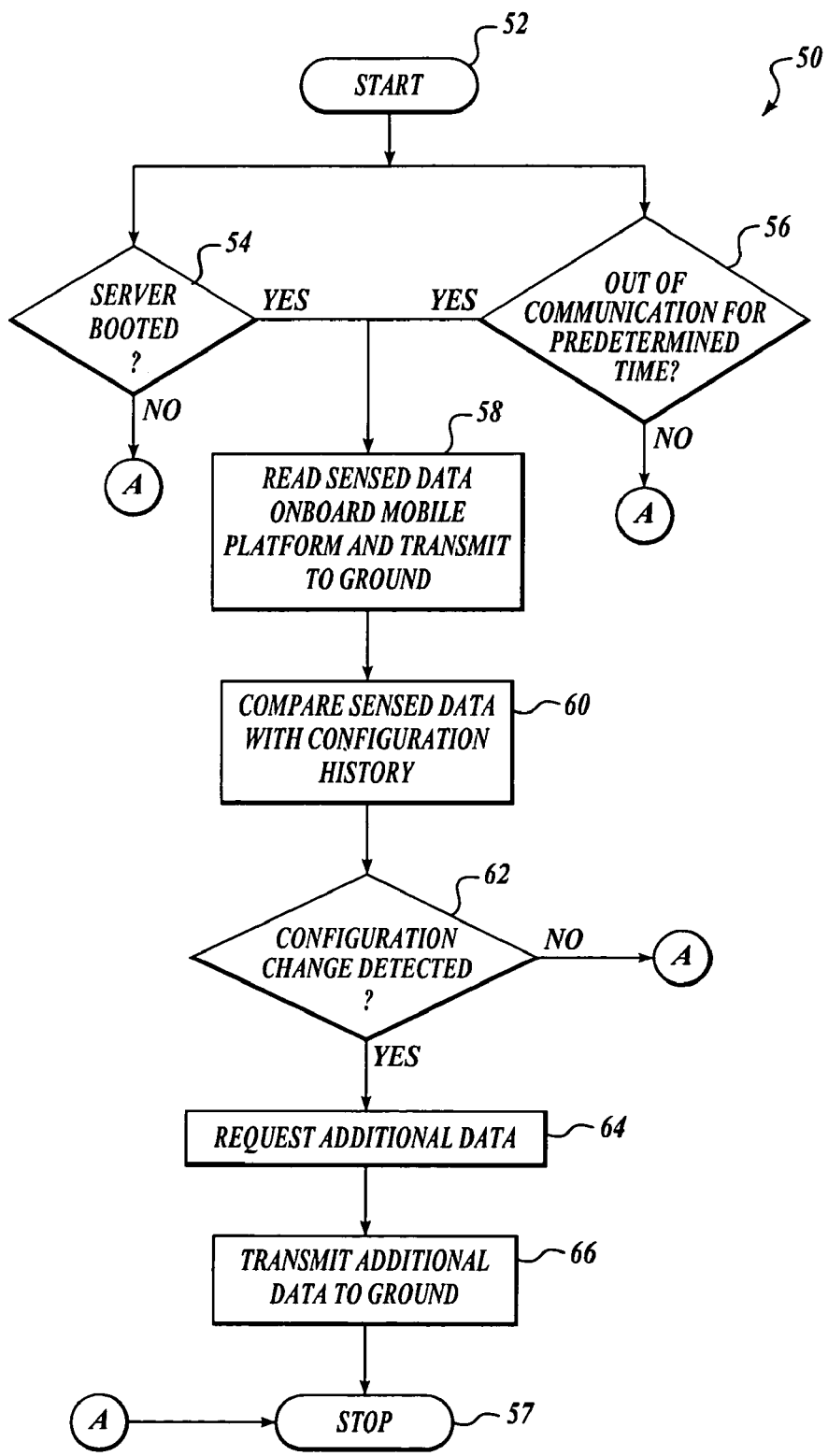
FIG. 4 is a flow chart of an exemplary method according to an embodiment of the present invention.

Referring additionally now to FIG. 4, a routine 50 is performed for reading and transmitting configuration data. The routine 50 starts at a block 52. At a decision block 54, a determination is made if the server 30 is booted and at a decision block 56 a determination is made whether the mobile platform 12 has been out of communication for a predetermined time period, such as without limitation for around an hour or so. If the server 30 is booted or if the mobile platform 12 has been out of communication for the predetermined time period, then the configuration data is sensed and transmitted at a block 58. At the block 58 the agent 36 causes configuration data for equipment and resident software onboard the mobile platform 12, as described above, to be sensed and read. An exemplary, non-limiting format for a message containing the configuration data is set forth in U.S. Patent No. 7,328,011, the contents of which are hereby incorporated by reference. If the server 30 is not booted or if the mobile platform 12 has not been out of communication for the predetermined time period, then the routine 50 ends at a block 57.

At a block 60, a comparison is made at the network control facility 16 between the configuration data that has been sensed and historical configuration data that is stored in suitable storage within the network control facility 16. At a decision block 62, a determination is made at the network control facility 16 whether or not a change in configuration data is detected between the historical configuration data and the sensed configuration data. If no change is detected, the routine 50 ends at the block 57. If a change in configuration data is detected, then at a block 64 additional data is requested in order to resolve any discrepancies. At a block 66 the requested additional data is sensed and transmitted to the network control facility 16. The routine 50 ends at the block 57.

It will be appreciated that the configuration data is not sent continuously and additional data is not sent unless requested when a change in the configuration data has been detected. Advantageously, transmission of the configuration data therefore does not consume a substantial amount of bandwidth. Thus, a significant portion of the bandwidth remains available for revenue-generating service of providing data content from the mobile platform 12.

Figure 5A:
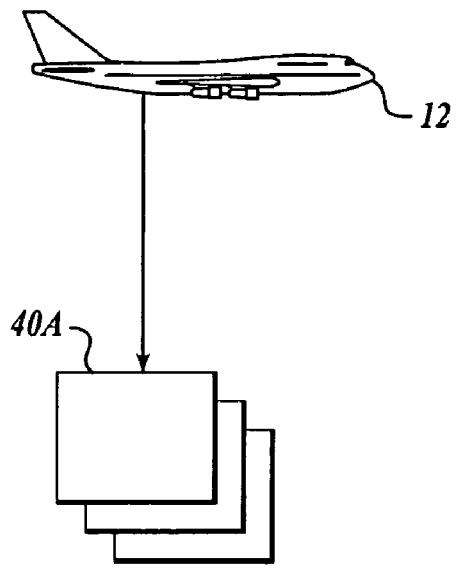
FIGS. 5A and 5B are diagrams showing additional portions of the system of FIG. 2.
Figure 5B:
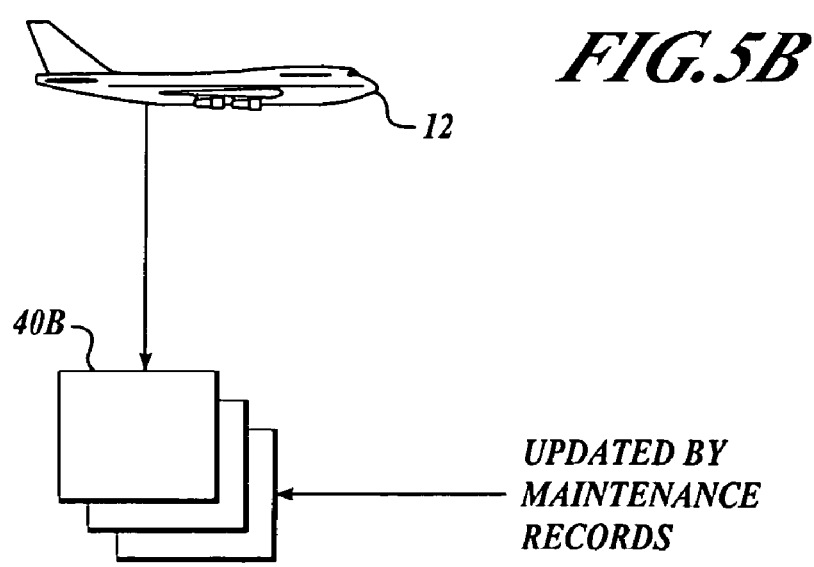

Referring now to FIGS. 3, 5A, and 5B, the database 40 suitably includes a database 40*a* (FIG. 5A) and a database 40*b* (FIG. 5B). The database 40*a* is a "sensed" database—that is, the database 40*a* contains configuration data read directly from the mobile platform 12. All updates to the database 40*a* are via electronic means as described above. As such, no personnel are involved in data entry into the database 40*a*.

The database 40*b* is an "installed" database—that is, the database 40*b* contains configuration data that is updated from maintenance records via the Web interface 42. The database 40*b* is populated initially with a set of sensed configuration data, but subsequent updates are made by personnel via the Web interface 42. While the Web interface 42 suitably includes automated aspects, in one embodiment actual data entry is nonetheless performed by personnel.

Advantageously, in an exemplary embodiment of the present invention, configuration data that is resident on the database 40*a* (the "sensed" database) and the database 40*b* (the "installed" database) is available to the network provider, the network provider's customers, and other stakeholders. The configuration data resident on the databases 40*a* and 40*b* is accessed via a secure Web portal. Advantageously, this access feature permits configuration management of fleets of mobile platforms.

A customer is allowed to view only the configuration data that applies to mobile platforms within the customer's fleet. In one embodiment, the customer does not see a history of configuration data. Instead, the customer can only access the last configuration data read from the customer's mobile platform. Nonetheless, a customer is able to compare records within the database 40 to the customer's own records, thereby mitigating discrepancies between maintenance records and actual installation onboard the customer's mobile platforms. Thus, a customer advantageously is able to maintain cognizance of the actual configuration of its mobile platforms in a timely manner.

Stakeholders of the network provider who have a business need to view configuration data also can access the last configuration data read from the mobile platforms. Exemplary stakeholders may include without limitation an operator of the network control facility 16, product support personnel for hardware and software components of the network 10, personnel of the network provider who are tasked with configuration management responsibilities, and the like. For example, product support personnel may track known hardware and/or software issues, track suspected hardware and/or software issues, identify mobile platforms provisioned with a particular Mod/Version, or the like. As another example, configuration management personnel may verify valid configurations or may identify mobile platforms provisioned with an invalid configuration, thereby mitigating service disruptions.

Now that an exemplary mobile communications network and exemplary systems and methods for configuration management have been set forth, screen shots of an exemplary implementation will be discussed.

Screen Shots of Exemplary Implementation

Figure 7:
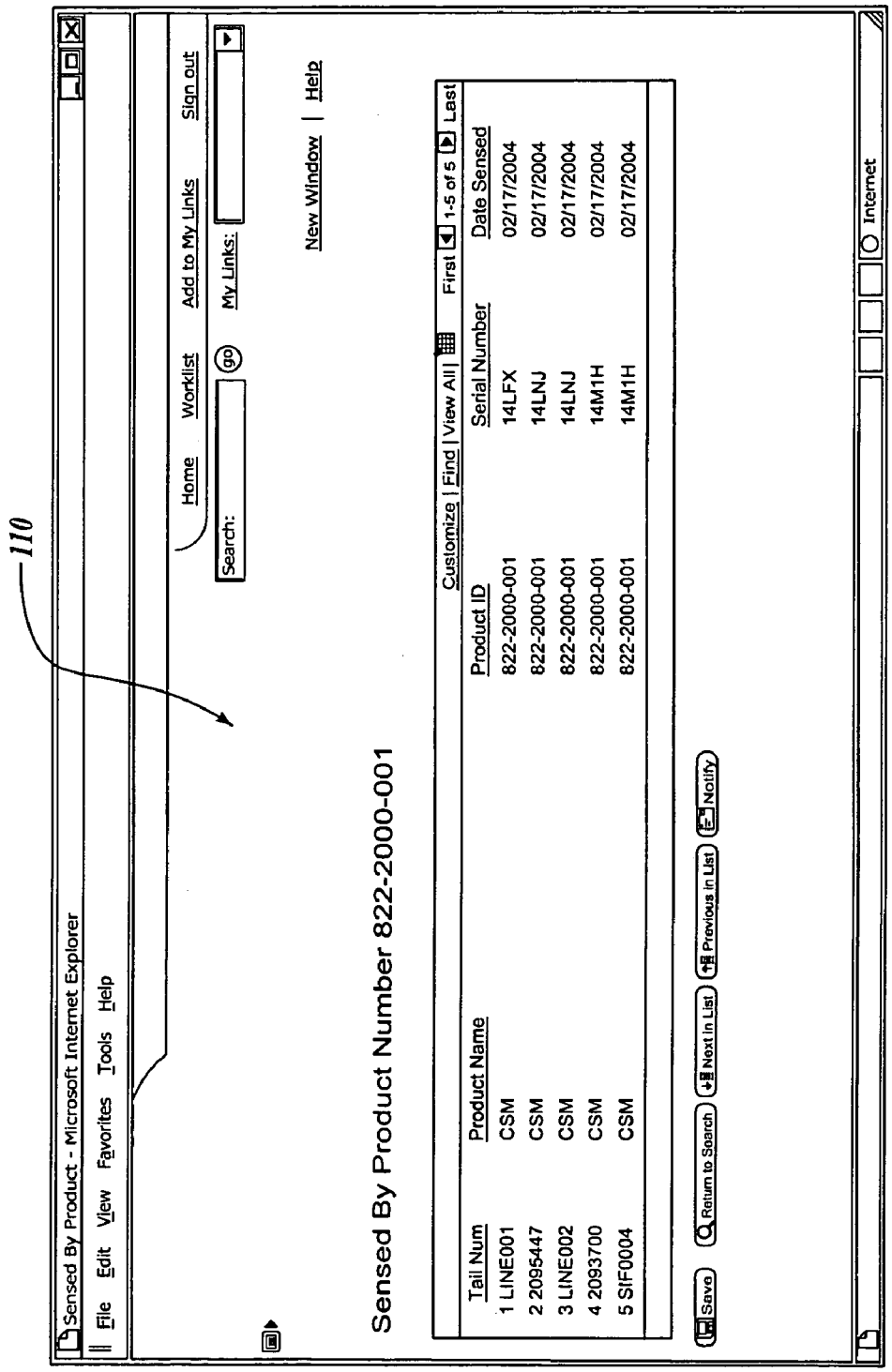
Figure 8:
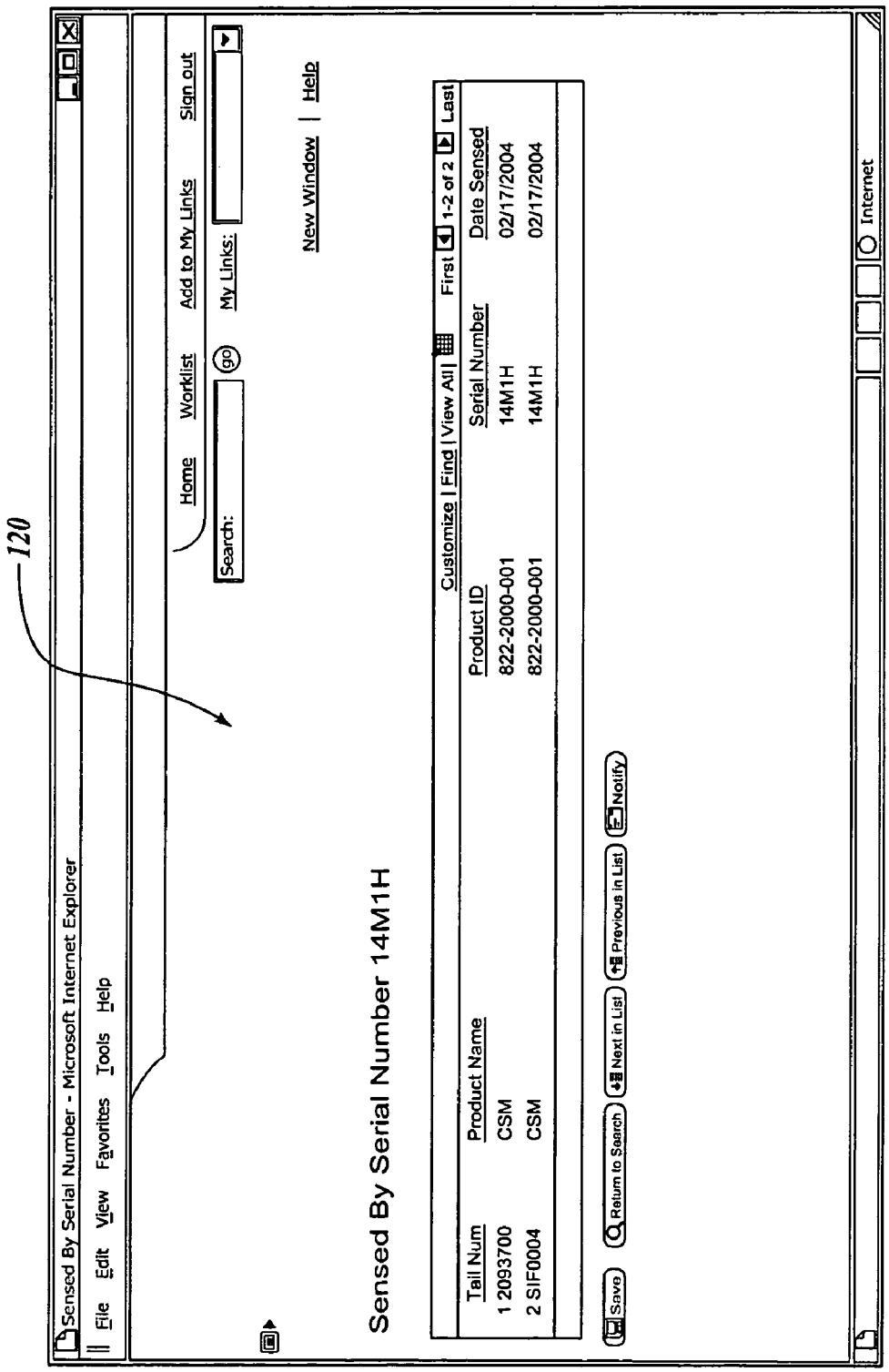
Figure 10:
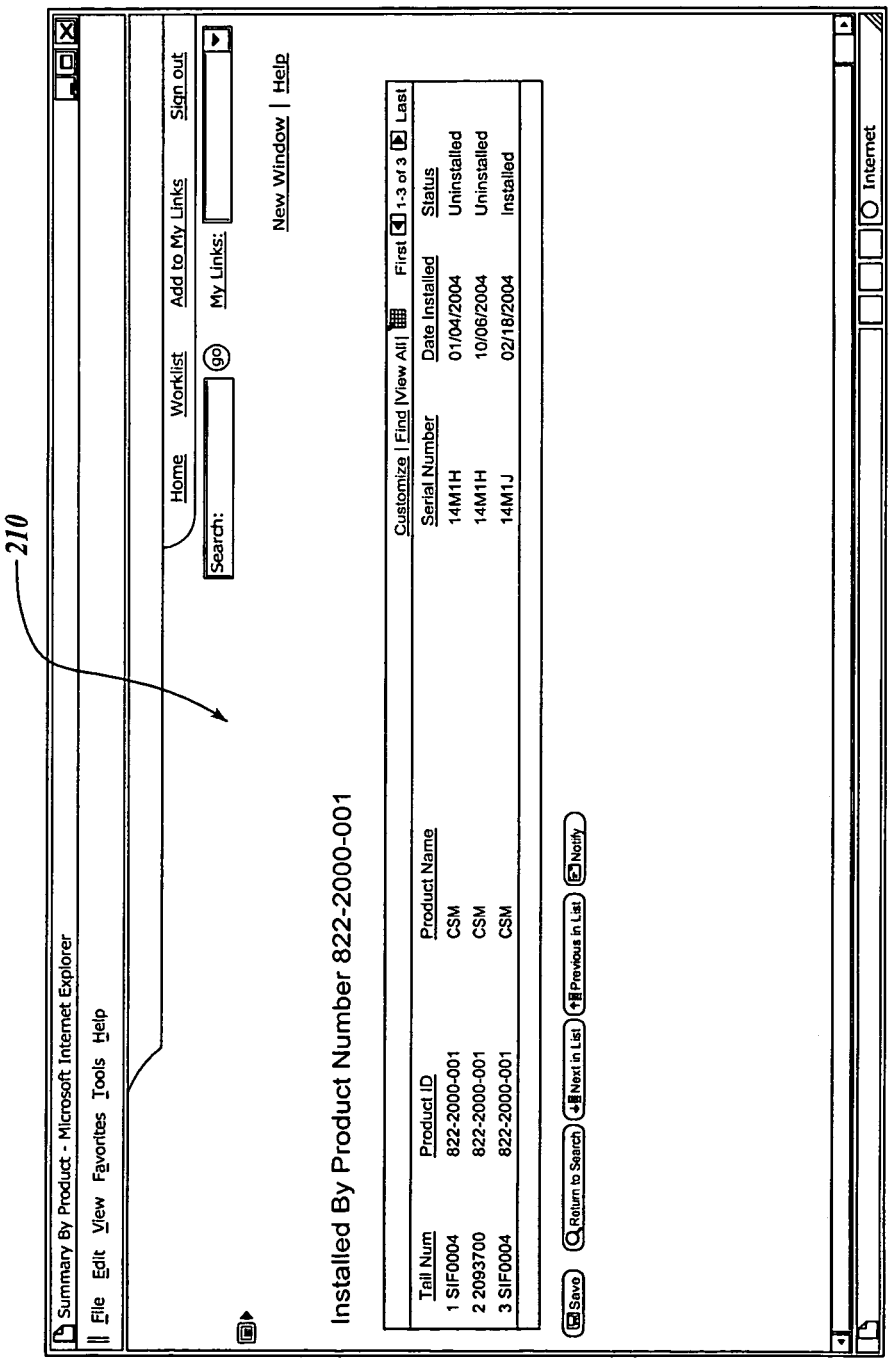
Figure 11:
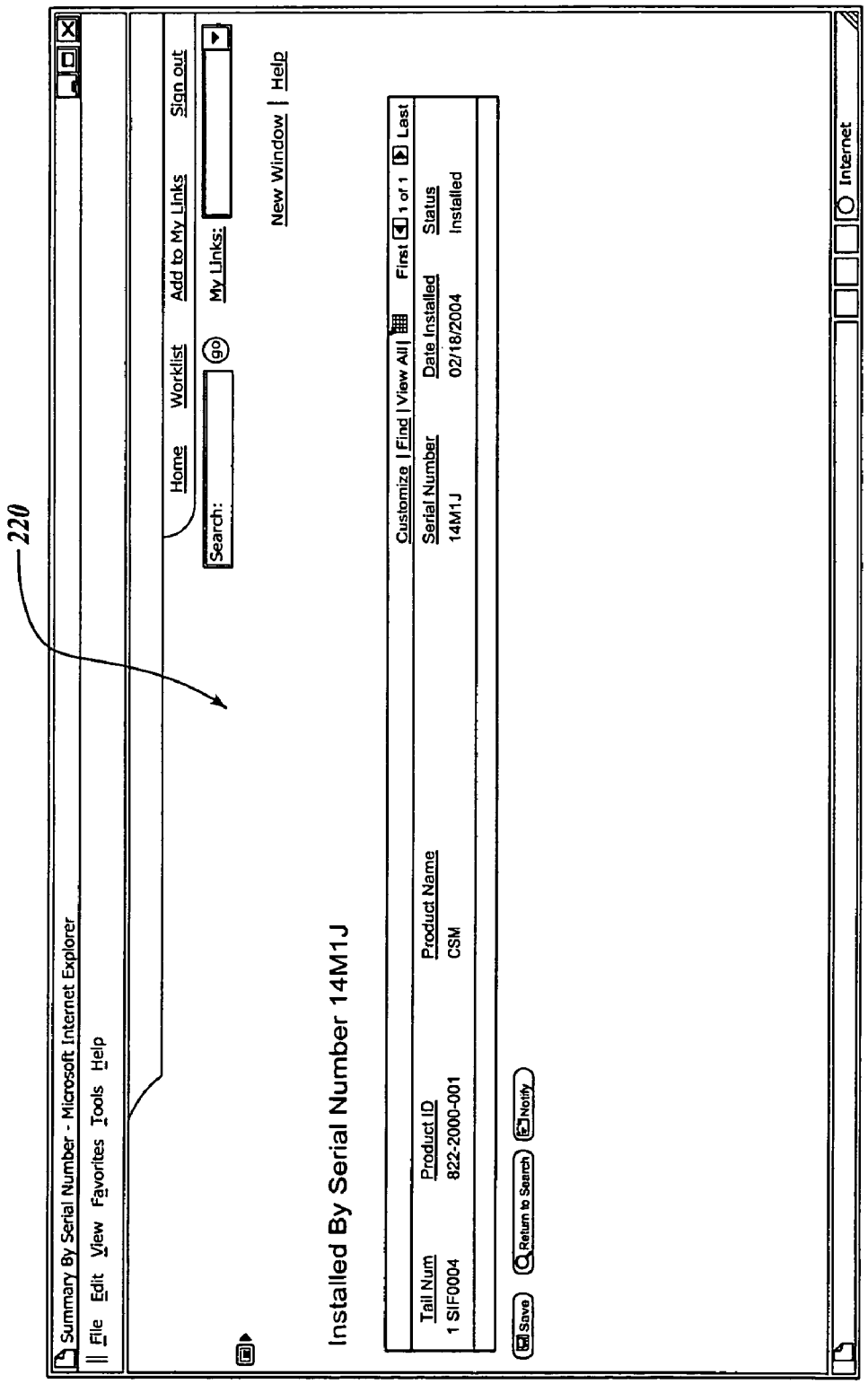
Figure 12:
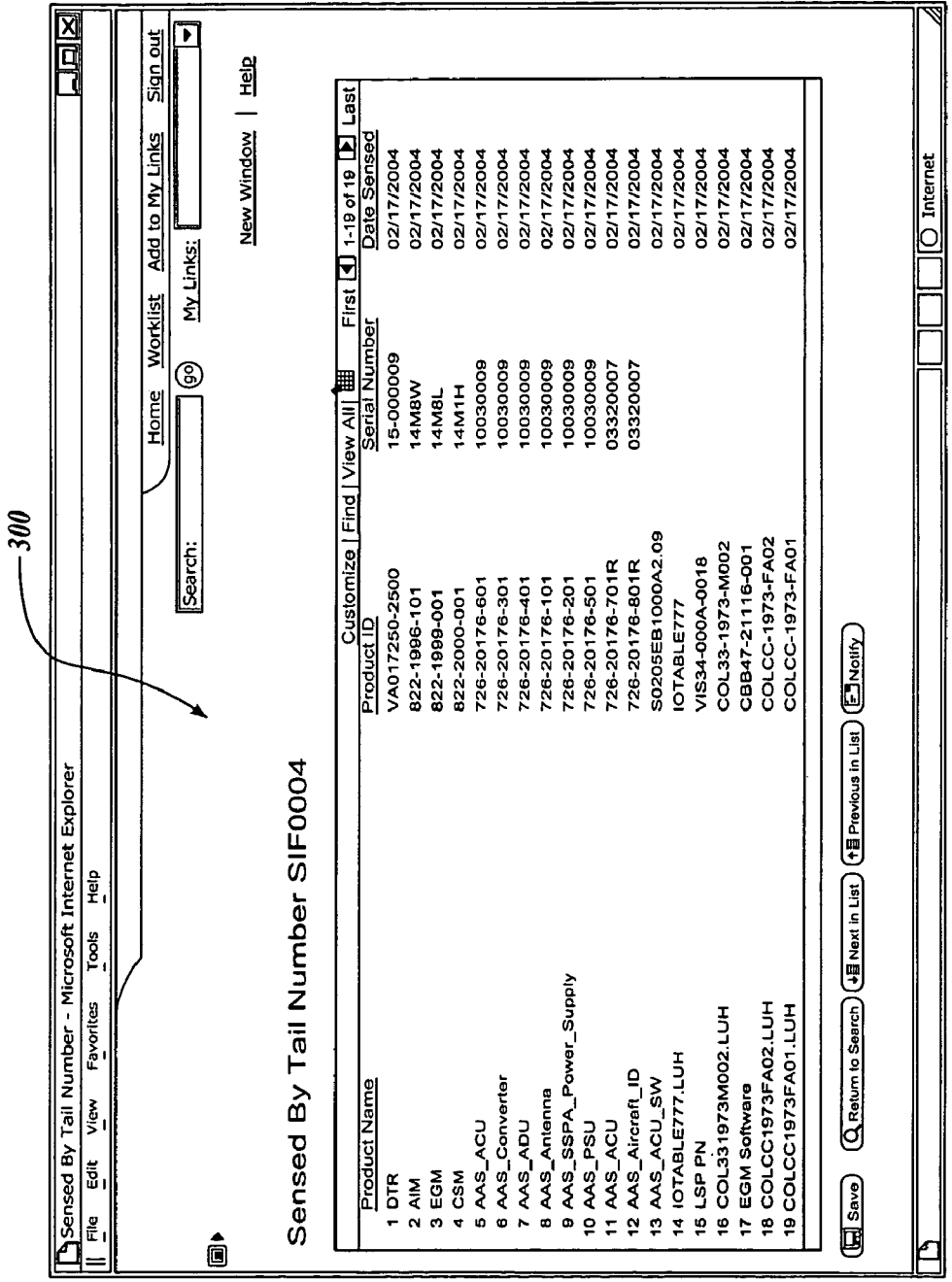
Figure 13:
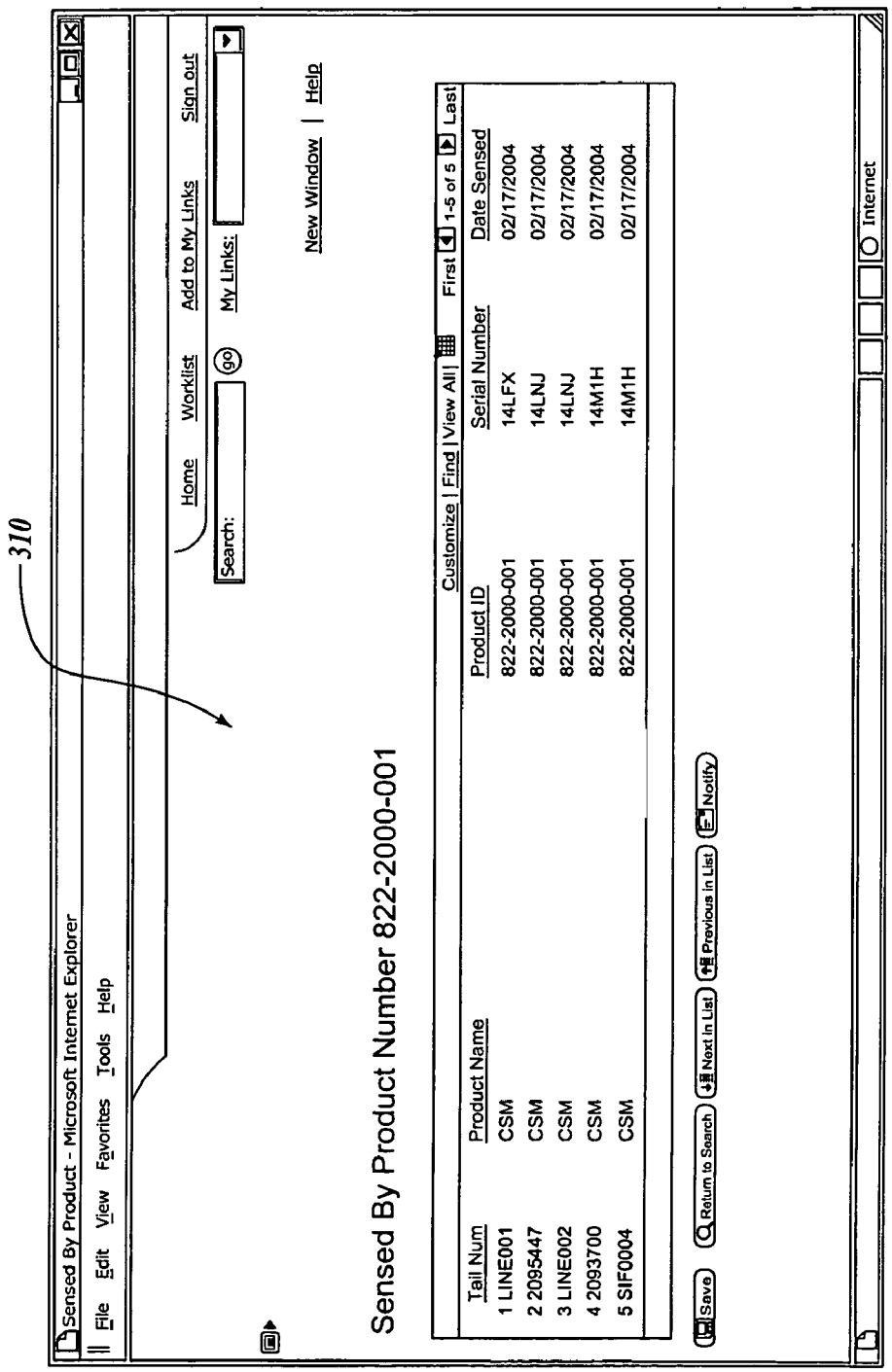
Figure 14:
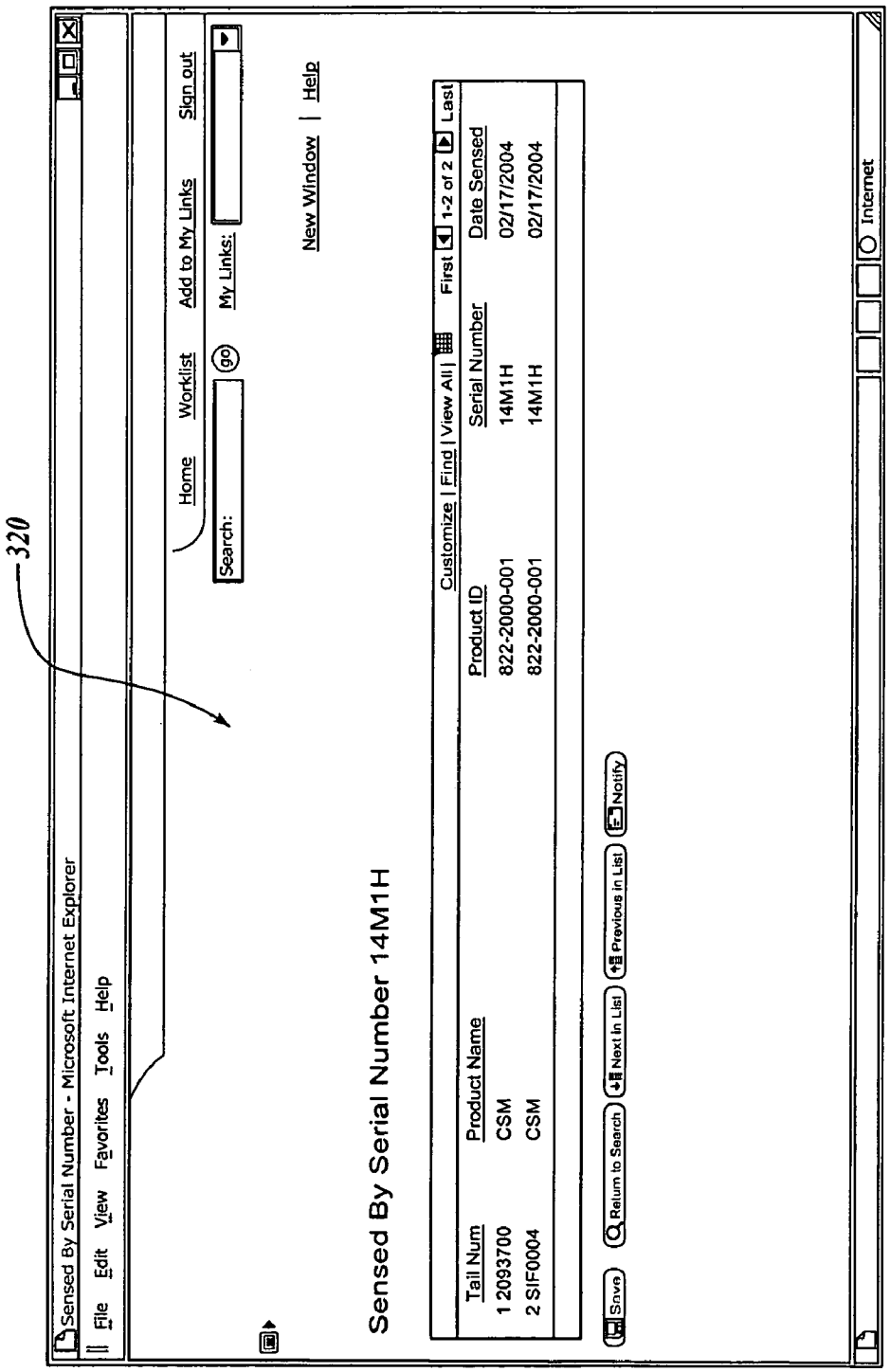

Referring now to FIGS. 6-14, screen shots provide examples of an exemplary implementation of an embodiment of the present invention. FIGS. 6-8 show the network provider's view of sensed configuration data resident on the database 40*a* for a mobile platform and a piece of equipment; FIGS. 9-11 show the network provider's view of corresponding installed configuration data resident on the database 40*b* for the same mobile platform and the same equipment; and FIGS. 12-14 show a customer's view of sensed configuration data resident on the database 40*a* for the same mobile platform and the same piece of equipment.

Referring now to FIG. 6, a screen 100 shows sensed configuration data for a particular mobile platform. In this case, the mobile platform is an aircraft with a tail number SIF0004. The screen 100 indicates that, among other hardware and software, a server (in this case, the server 30 (FIG. 2)) is sensed with a part number 822-2000-001 and serial number 14M1H. The configuration data was sensed on Feb. 17, 2004.

Referring now to FIG. 7, a screen 110 shows sensed configuration data for the server 30 having the part number 822-2000-001. In this case, the server 30 (that is, the piece of equipment with a part number 822-2000-001) with a serial number of 14M1H was sensed on a mobile platform with a tail number 2093700 on Feb. 12, 2004. Advantageously, the screen 110 shows that the same piece of equipment (same part number and same serial number) was later sensed on the mobile platform with the tail number SIF0004 on Feb. 17, 2004.

Referring now to FIG. 8, a screen 120 shows sensed configuration data for the server 30 having the part number 822-2000-001 and the serial number 14M1H. In this case, the only two line item entries on the screen 120 bear out that the server 30 having the part number 822-2000-001 and the serial number 14M1H was sensed on the mobile platform with the tail number 2093700 on Feb. 12, 2004 and was later sensed on the mobile platform with the tail number SIF0004 on Feb. 17, 2004.

Referring now to FIG. 9, a screen 200 shows installed configuration data for a particular mobile platform. In this case, the mobile platform is the aircraft with the tail number SIF0004. The screen 200 indicates that, among other hardware and software, maintenance records indicate that a server (in this case, the server 30 (FIG. 2)) with a part number 822-2000-001 and serial number 14M1J was installed on Feb. 18, 2004.

Referring now to FIG. 10, a screen 210 shows installed configuration data for the server 30 having the part number 822-2000-001. In this case, the server 30 (that is, the piece of equipment with a part number 822-2000-001) with the serial number of 14M1H was installed on the mobile platform with the tail number 2093700 on Oct. 6, 2004 but is now uninstalled. The screen 210 also shows that the server 30 with the part number 822-2000-001 and the serial number 14M1J was installed on the mobile platform with the tail number SIF0004 on Feb. 18, 2004 and remains installed.

Referring now to FIG. 11, a screen 220 shows installed configuration data for the server 30 having the part number 822-2000-001 and the serial number 14M1J. In this case, the only line item entry on the screen 220 bears out that the server 30 having the part number 822-2000-001 and the serial number 14M1J was installed on the mobile platform with the tail number SIF0004 on Feb. 18, 2004 and remains installed.

Referring now to FIG. 12, a screen 300 shows a customer's view of sensed configuration data for a particular mobile platform within the customer's fleet. In this case, the mobile platform is the aircraft with the tail number SIF0004. As a result, the information contained in the screen 300 is the same as the information contained in the screen 100 (FIG. 6) and need not be repeated.

Referring now to FIG. 13, a screen 310 shows a customer's view of sensed configuration data for the server 30 having the part number 822-2000-001. In this case, the server 30 (that is, the piece of equipment with a part number 822-2000-001) was sensed on mobile platforms in the customer's fleet that are the same mobile platforms shown in the screen 110 (FIG. 7). As a result, the information contained in the screen 310 is the same as the information contained in the screen 110 (FIG. 7) and need not be repeated.

Referring now to FIG. 14, a screen 320 shows a customer's view of sensed configuration data for the server 30 having the part number 822-2000-001 and the serial number 14M1H. In this case, the information contained in the screen 320 is the same as the information contained in the screen 310 (FIG. 8) and need not be repeated.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for managing configuration of a mobile communications network, the method comprising:
   receiving an electronic report including sensed configuration data indicating at least one of equipment aboard a mobile platform and resident software aboard the mobile platform, wherein the electronic report is generated based on sensed configuration data automatically sensed onboard the mobile platform after the mobile platform has been out of communication with a terrestrial station of a mobile communications network for a predetermined time period;
   transferring the sensed configuration data to a first terrestrial database via a mobile communications network; and
   generating a display of the sensed configuration data that pertains to the mobile platform, wherein the display is accessible by a particular user, and wherein the display does not enable the particular user to access historical configuration data;
   wherein predetermined configuration data including the historical configuration data is recorded onboard the mobile platform and stored in a second terrestrial database, and wherein the sensed configuration data includes data that pertains to a mobile platform in a customer's fleet and is accessible by the customer, and wherein the predetermined configuration data is not accessible by the customer.

2. The method of claim 1, wherein the sensed configuration data includes hardware part number and serial number.

3. The method of claim 1, wherein the sensed configuration data includes software part number and version number.

4. The method of claim 1, wherein the sensed configuration data is trackable to at least one of serialized line replaceable units and serialized line replaceable modules.

5. The method of claim 1, wherein the sensed configuration data is accessible by an operator of the mobile communications network.

6. The method of claim 1, further comprising comparing the sensed configuration data with the predetermined configuration data.

7. The method of claim 6, further comprising, when a change is determined between the sensed configuration data and the predetermined configuration data, requesting additional sensed configuration data.

8. The method of claim 7, further comprising receiving another electronic report including the additional sensed configuration data.

9. The method of claim 6, further comprising generating an alert when a difference is determined between the sensed configuration data and the predetermined configuration data.

10. The method of claim 1, wherein generating the display of the sensed configuration data comprises generating a web interface including the sensed configuration data.

11. The method of claim 1, wherein generating the display of the sensed configuration data comprises:

generating a first display including a first view accessible by a provider of the mobile communications network; and generating a second display including a second view accessible by a user of the mobile communications network, wherein the first view and the second view are different.

12. The method of claim 11, wherein the first display includes information about one or more mobile platforms that are not associated with the user of the mobile communications network.

13. A system for managing configuration of a mobile communications network, the system comprising:
a terrestrial station including:
a communications component to communicate data with a communications system onboard a mobile platform, wherein the communications system onboard the mobile platform automatically gathers sensed configuration data when the communications system has been out of communication with the terrestrial station for a predetermined time period and wherein the communication system reports the sensed configuration data to the terrestrial station, wherein the sensed configuration data includes at least one of an identity of equipment aboard the mobile platform and an identity of resident software aboard the mobile platform;
a first database component configured to store the sensed configuration data received from the mobile platform; and
a display interface to generate a first display of the sensed configuration data that includes a first view accessible by a provider of the mobile communications network, and to generate a second display of the sensed configuration data that includes a second view accessible by a user of the mobile communications network, wherein the first view and the second view are different.

14. The system of claim 13, wherein the communications system onboard the mobile platform places the sensed configuration data in a message having a predetermined format.

15. The system of claim 14, wherein the communications system onboard the mobile platform further includes a transmitter configured to transmit the message.

16. The system of claim 13, wherein the terrestrial station further includes a second database component configured to store predetermined configuration data regarding equipment and software installed onboard the mobile platform.

17. The system of claim 13, wherein the configuration data includes a part number and a serial number.

18. The system of claim 13, wherein hardware may be tracked to at least one of serialized line replaceable units and serialized line replaceable modules.

19. The system of claim 13, wherein configuration data is accessible by an operator of the terrestrial station.

20. The system of claim 13, wherein configuration data that pertains to a mobile platform in a customer's fleet may be accessed by the customer.

21. A method for managing configuration of a mobile communications network, the method comprising:
receiving an electronic report via a mobile communications network, the electronic report including sensed configuration data identifying at least one of equipment aboard a mobile platform and resident software aboard the mobile platform, wherein the electronic report is generated based on sensed configuration data automatically sensed onboard the mobile platform after the mobile platform has been out of communication with a terrestrial station of a mobile communications network for a predetermined time period;
generating a first display based on the sensed configuration data, the first display including a first view accessible by a provider of the mobile communications network; and
generating a second display based on the sensed configuration data, the second display including a second view accessible by a user of the mobile communications network, wherein the first view and the second view are different.

22. The method of claim 21, wherein the first display includes information about one or more mobile platforms that are not associated with the user of the mobile communications network.

23. A system for managing configuration of a mobile communications network, the system comprising:
a communications system onboard a mobile platform, the communications system configured to electronically report sensed configuration data for at least one set of configuration items chosen from an identity of equipment aboard the mobile platform and an identity of resident software aboard the mobile platform, the communications system including a server having a first component configured to automatically sense the sensed configuration data responsive to the mobile platform being out of communication with a mobile communications network for a predetermined time period; and
a terrestrial station including:
a communications component configured to communicate data with the mobile platform;
a first database component configured to store sensed configuration data received from the mobile platform; and
a display device configured to generate a first view of the sensed configuration data, the first view accessible by a provider of the mobile communications network and to generate a second view of the sensed configuration data, the second view accessible by a user of the mobile communications network, wherein the first view and the second view are different.

24. The method of claim 23, wherein the first view includes information about one or more mobile platforms that are not associated with the user of the mobile communications network.

* * * * *